(12) United States Patent
Belavy et al.

(10) Patent No.: US 10,368,137 B2
(45) Date of Patent: Jul. 30, 2019

(54) SYSTEM FOR PRESENTING VIDEO INFORMATION AND METHOD THEREFOR

(71) Applicant: VUDU, INC., Sunnyvale, CA (US)

(72) Inventors: Stefan Belavy, Oakland, CA (US); Sirisha Naga Lakshmi Yenigalla, Fremont, CA (US); Julian Franco, Newbury Park, CA (US); Wyatt Leung, Cupertino, CA (US)

(73) Assignee: VUDU, INC., Sunnyvale, CA (US)

( * ) Notice: Subject to any disclaimer, the term of this patent is extended or adjusted under 35 U.S.C. 154(b) by 0 days.

(21) Appl. No.: 14/828,331

(22) Filed: Aug. 17, 2015

(65) Prior Publication Data

US 2017/0054961 A1    Feb. 23, 2017

(51) Int. Cl.

| | |
|---|---|
| *H04N 21/472* | (2011.01) |
| *H04N 21/81* | (2011.01) |
| *H04N 21/431* | (2011.01) |
| *H04N 21/482* | (2011.01) |
| *H04N 9/87* | (2006.01) |
| *G11B 27/00* | (2006.01) |
| *H04N 21/422* | (2011.01) |
| *H04N 5/76* | (2006.01) |

(52) U.S. Cl.
CPC ......... *H04N 21/4825* (2013.01); *G11B 27/00* (2013.01); *H04N 21/4316* (2013.01); *H04N 21/47217* (2013.01); *H04N 21/8133* (2013.01); *H04N 5/76* (2013.01); *H04N 21/42224* (2013.01)

(58) Field of Classification Search
CPC ......... H04N 21/4316; H04N 21/47205; H04N 21/47217; H04N 21/4825; H04N 21/8133

USPC .......................................................... 386/240
See application file for complete search history.

(56) References Cited

U.S. PATENT DOCUMENTS

| | | | |
|---|---|---|---|
| 8,301,648 B2 | 10/2012 | Poniatowski et al. | |
| 8,385,813 B2 | 2/2013 | Rao | |
| 8,818,179 B1 | 8/2014 | Barton | |
| 8,839,316 B2 | 9/2014 | Hariharan et al. | |
| 2002/0059602 A1* | 5/2002 | Macrae | H04N 5/44543 725/42 |
| 2008/0066102 A1* | 3/2008 | Abraham | H04N 5/44591 725/37 |
| 2012/0144424 A1* | 6/2012 | Ganesan | H04N 21/42204 725/40 |
| 2014/0189608 A1* | 7/2014 | Shuttleworth | G06F 3/0484 715/863 |

(Continued)

*Primary Examiner* — Thai Q Tran
*Assistant Examiner* — Nienru Yang
(74) *Attorney, Agent, or Firm* — Bryan Cave Leighton Paisner LLP (57) ABSTRACT

A system and method for scrolling through a media file is presented. Playback of a media file is initiated. An instruction is received an instruction to enter an expanded view mode. The expanded view mode can include an information view mode and a poster mode. In the information view mode, a variety of information about the media file is displayed, including a synopsis, cast information, and the like. In the poster mode, a variety of graphical images are displayed, each representing a different media file and configured to resemble a movie poster. The media files can be trailers or other type of previews. There can be a method for a user to add a preview to a wishlist or order the media file represented by the preview. Other embodiments are disclosed.

24 Claims, 8 Drawing Sheets

(56) References Cited

U.S. PATENT DOCUMENTS

| | | | |
|---|---|---|---|
| 2014/0229309 A1* | 8/2014 | Talreja | G06Q 30/00 705/26.1 |
| 2014/0229834 A1* | 8/2014 | Jain | G06F 3/0488 715/720 |
| 2014/0250390 A1* | 9/2014 | Holmes | G06F 3/04817 715/760 |
| 2015/0106856 A1* | 4/2015 | Rankine | H04N 21/8583 725/60 |
| 2015/0113407 A1* | 4/2015 | Hoffert | G06F 3/0482 715/720 |

* cited by examiner

SYSTEM FOR PRESENTING VIDEO INFORMATION AND METHOD THEREFOR

TECHNICAL FIELD

This disclosure relates generally to media playback, and relates more particularly to the presentation of information related to video playback.

BACKGROUND

There is an increasing number of consumers who are consuming media, including video content (e.g., movies and TV shows) via streaming media services. Often times, consumers wish to receive information about media content they are watching. Current methods of receiving information about media content advancing through media content might result in a less than ideal user experience.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can comprise: one or more processing modules; and one or more non-transitory storage modules storing computing instructions configured to run on the one or more processing modules and perform the acts of: initiating playback of an active media file; receiving an instruction to enter an expanded view mode; displaying a screen simultaneously with the playback of the active media file, wherein the screen includes an ability to switch between an information mode and a poster mode; displaying the information mode on the screen simultaneously with the playback of the active media file upon receiving a request to enter the information mode; displaying the poster mode on the screen simultaneously with the playback of the active media file upon receiving a request to enter the poster mode; receiving an instruction to end the expanded view mode; and closing the screen during the playback of the active media file.

Some embodiments include a method. The method can comprise: initiating playback of an active media file; receiving an instruction to enter an expanded view mode; displaying a screen simultaneously with the playback of the active media file, wherein the screen includes an ability to switch between an information mode and a poster mode; displaying the information mode on the screen simultaneously with the playback of the active media file upon receiving a request to enter the information mode; displaying the poster mode on the screen simultaneously with the playback of the active media file upon receiving a request to enter the poster mode;

receiving an instruction to end the expanded view mode; and closing the screen during the playback of the active media file.

In some embodiments, the user can use a video player to binge watch content, including trailers. The content can eventually built to be a playlist, where the user can watch content continuously without leaving the player. The user can add the content to their wishlist, as well as finding the information of the content from within the player.

When the user slides the expander up from the bottom of the player, they see the list of graphical images which represent the content with trailers, arranged in a queue. The user can tap on posters to start the trailer of that content. There can be wishlist and information buttons on the top of this panel. The user can tap on the information icon to get quick information about the content from which they can jump into a details page. They can add the content to their wishlist by tapping on the wishlist icon.

Figure 1:
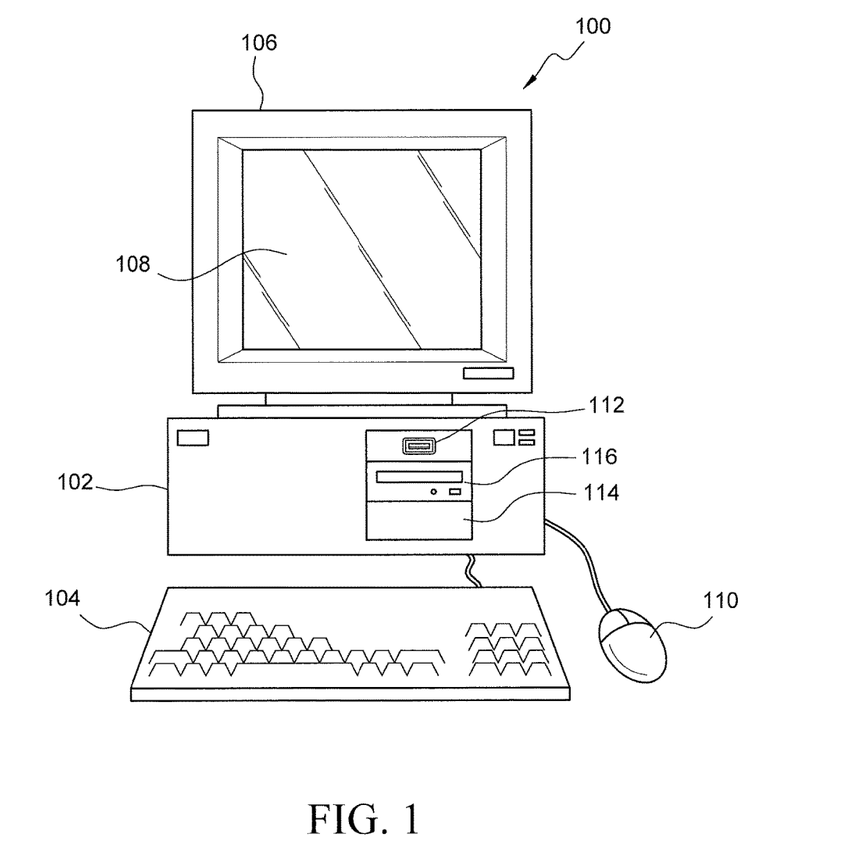
FIG. 1 illustrates a front elevation view of a computer system that is suitable for implementing at least part of a central computer system, according to an embodiment.
Figure 2:
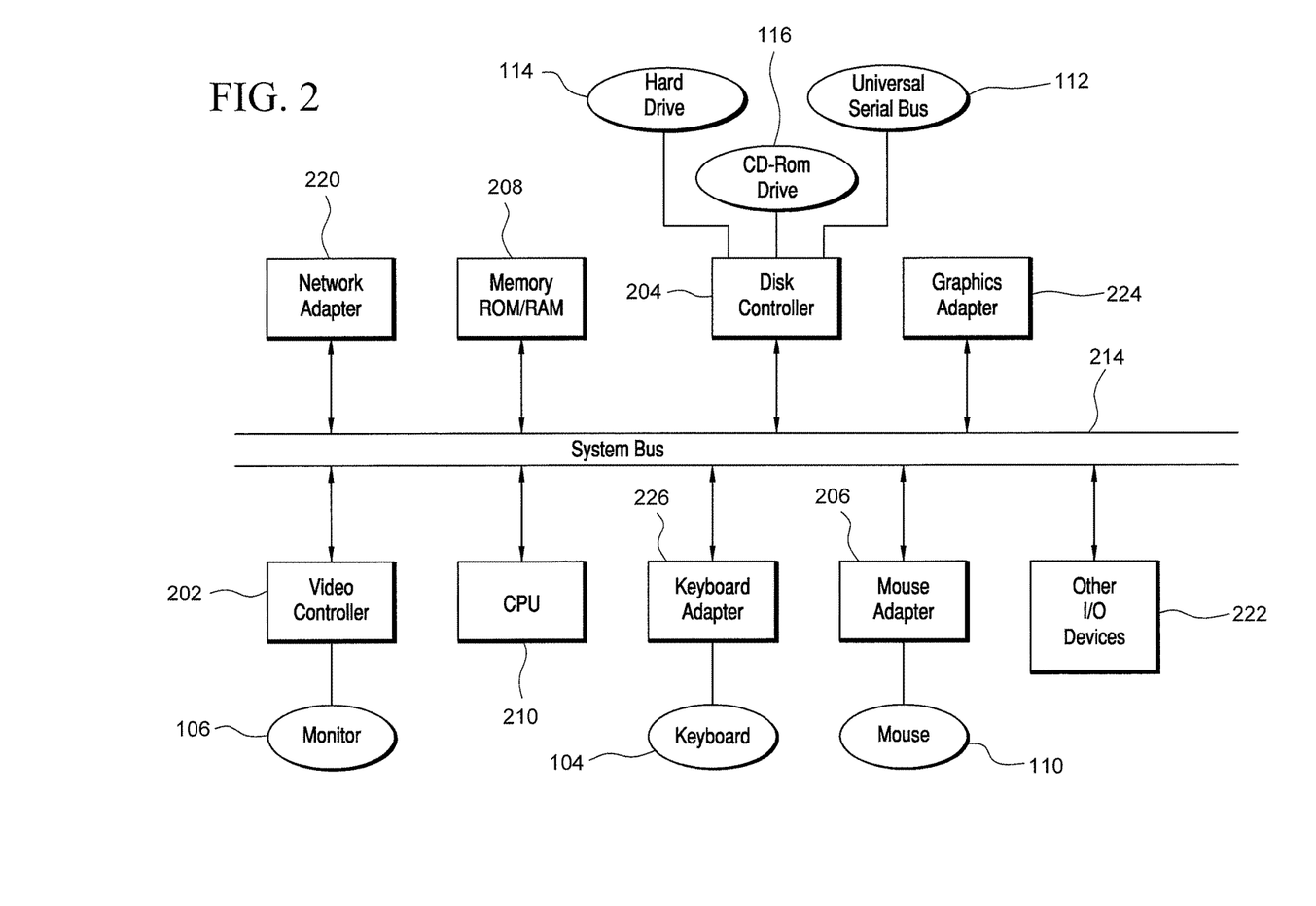
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a drive 114. Drive 114 can be a hard drive that uses spinning magnetic disks to store data or it can be a solid state drive (SSD) that uses a fast, non-volatile memory for storage. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
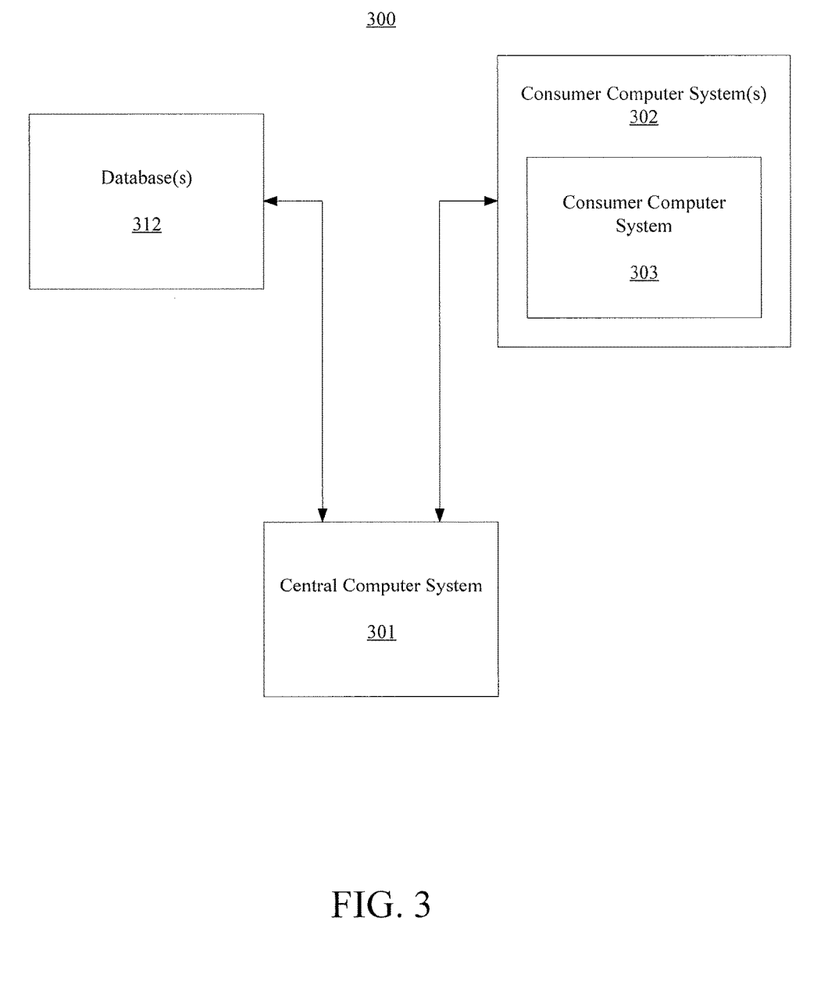
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more predetermined acts performed by the consumer; and reactive acts can refer to acts (e.g., identification, determination, communication, etc.) performed with consideration of (i.e., in response to) one or more predetermined acts performed by the consumer. For example, in some embodiments, the predetermined act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touchscreen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not be a remote manner, as well), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, each of consumer computer system(s) 302 can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™, and Windows 10 (mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312 or it can be spread across multiple of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, and the like. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer, but in many embodiments, the functionality of system 300 can be extended to each of consumer computer system(s) 302 and/or to multiple consumers. In these extended examples, in some embodiments, single consumers can interface (e.g., interact) with central computer system 301 using multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

Recent advancements in computer technology have made the consumption of media, including audio and video, on mobile devices more and more common. Previously, one had to use optical media such as DVD and Blu-ray discs in order to view media files. However, improved download speeds and the proliferation of mobile devices has made the consumption of media on mobile devices (some of which cannot read optical media) increasingly more common.

One thing that many mobile devices have in common is the use of a touchscreen interface, also known as a touch-sensitive display. On such a touchscreen interface, instead of a user using a remote control, keyboard, mouse, or other type of interface, the user directly touches the screen upon which the media file is being displayed. The touchscreen has a variety of mechanisms by which it can detect a touch, either by a stylus or a finger. Exemplary touchscreen technologies include resistive touchscreens, capacitive touchscreens, optical imaging, and the like, though embodiments are not limited to any specific touchscreen technology. Some embodiments also can use other touch-sensitive devices, such as a touchpad.

Often, when a user is viewing a media file, the user might want to view additional information about the media file. There can be many reasons to do so. For example, the user might be viewing trailers or previews of available movies and wish to learn about the movie or order the movie.

Figure 4:
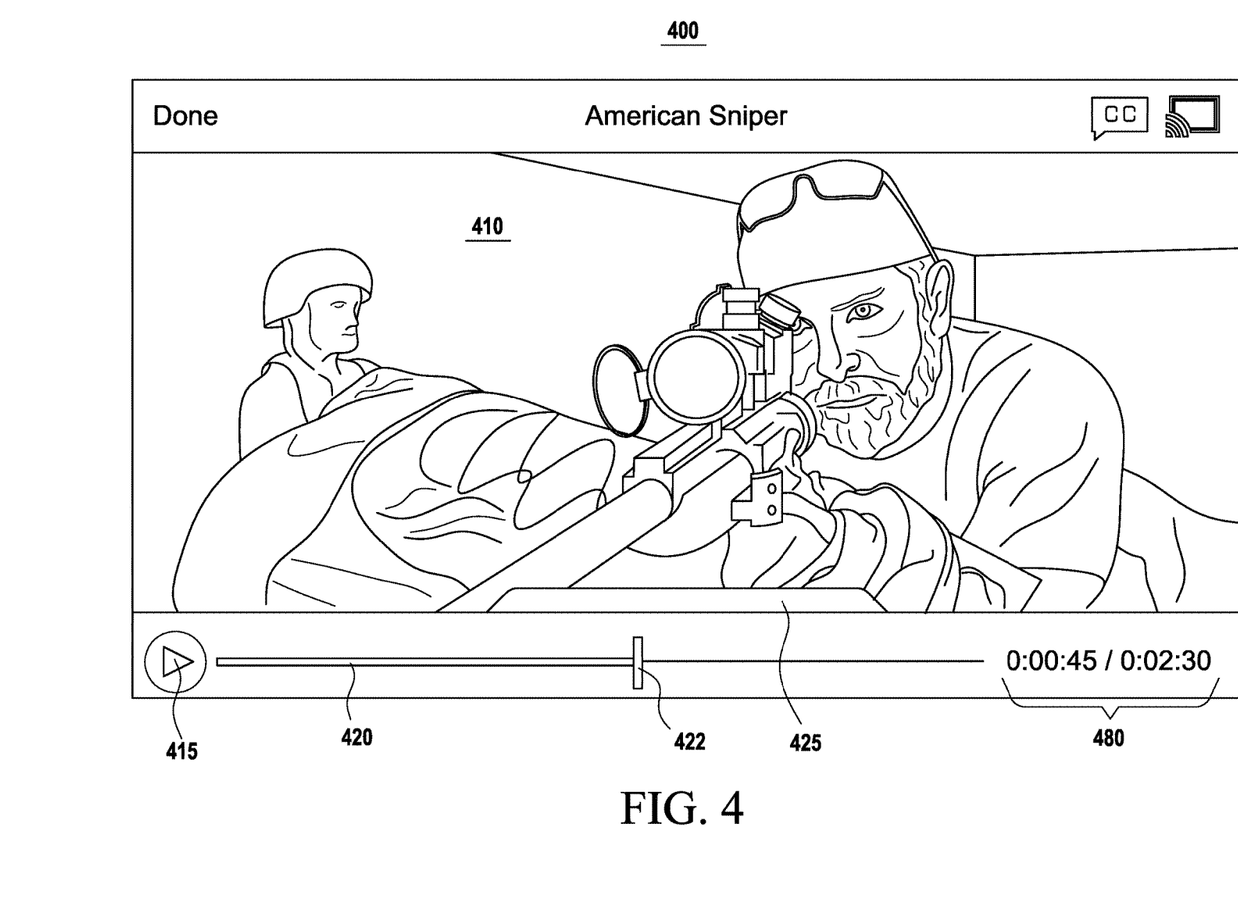
FIG. 4 is a screenshot illustrating a screen layout according to an embodiment.

With reference to FIG. 4, a screen shot 400 containing an exemplary interface is illustrated. As an example, screen shot 400 can be shown on a screen of monitor 106 (FIG. 1).

Window 410 is used to display the media content (such as a movie). Also present in screen shot 400 are transport controls 415, slider 420, and expander 425. Transport controls 415 allow a user to start, stop, and pause a media file. Other transport controls (such as fast forward and fast reverse) also might be present, but are not illustrated in FIG. 4, such as window sizing controls, volume controls, captioning controls, and the like. There also can be status displays 480, such as elapsed time, time remaining, and the like. Slider 420 serves two main purposes. First, slider 420 provides a visual indication of where in the media file the user is at. In a 10-minute media file, when the user is at the 5-minute mark of the media file, an indicator 422 on slider 420 will be at approximately the half-way point of slider 420. Indicator 422 can take a variety of different forms. For example, indicator 422 can be a shape (such as a diamond, square, circle, etc.) or indicator 422 can be a bar graph. Indicator 422 can take other forms as well. Slider 420 also allows a user to advance a media file to a specific point of a media file. For example, a user might want to advance to a point that is approximately 6 minutes into a 10-minute media file. The user would move indicator 422 within slider 420 until 6 minutes is displayed in the status area.

Expander 425 allows a user to access additional information about the media file being viewed. In traditional user interface, a user must access a different screen in order to access additional information about the media file being viewed. This different screen results in a discontinuous user experience, as the user can no longer see what he was watching.

In some embodiments, expander 425 is activated by swiping expander 425 in an upward motion. In some embodiments, expander 425 might be a button that, when activated, results in the information screen being shown. Expander 425 can be used in embodiments using a touch-sensitive interface. Expander 425 also can be used in embodiments using other types of interfaces, such as a mouse-controlled interface in a web browser or a remote-control interface in a set-top box. While expander 425 is shown in FIG. 4 as an arrow, it should be understood that expander 425 is not limited to such a configuration.

Figure 5A:
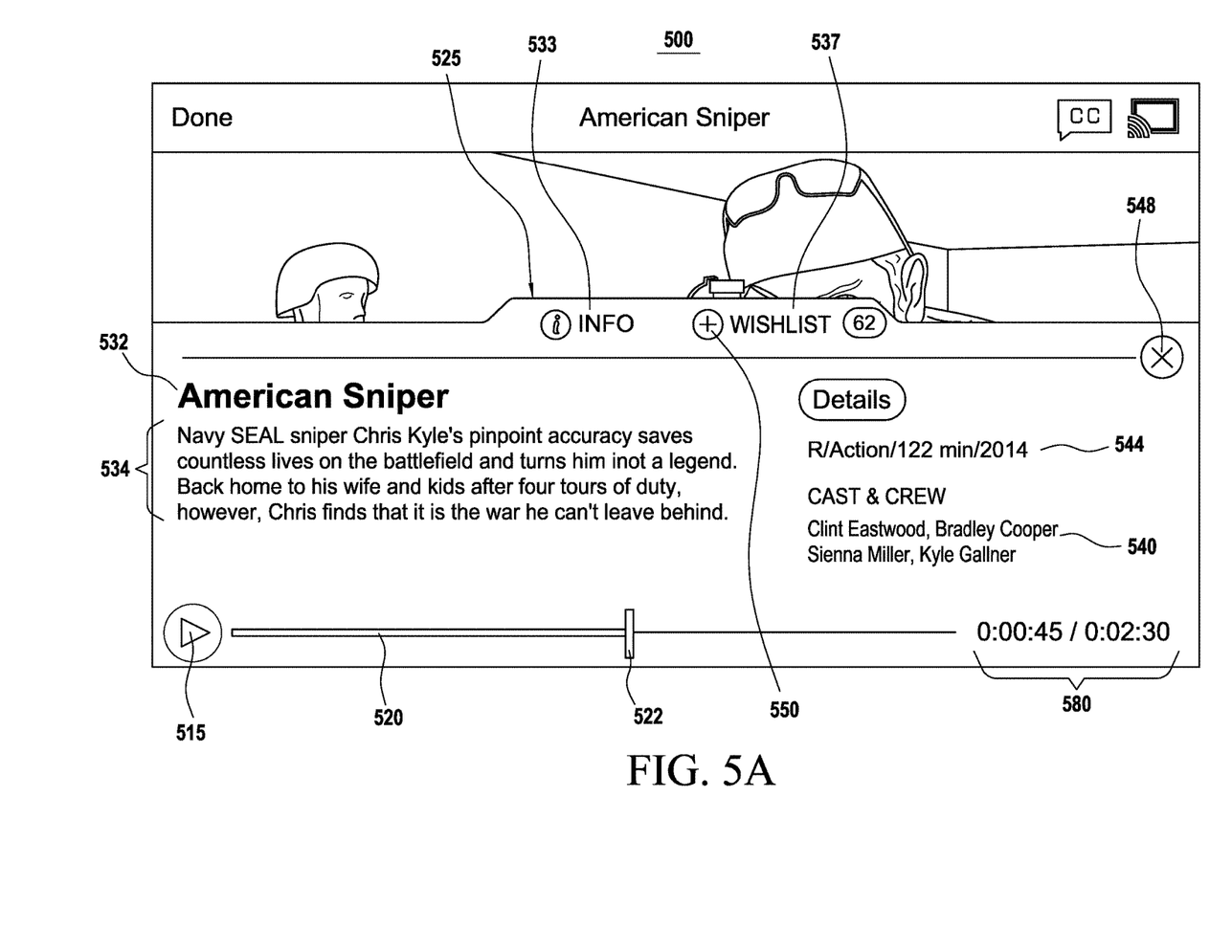
FIGS. 5A-5B are screenshots illustrating screen layouts according to the embodiment of FIG. 4.

With reference to FIG. 5A, a screen shot 500 containing an illustration of an exemplary interface of after the expander screen is opened. As an example, screen shot 500 can be shown on a screen of monitor 106 (FIG. 1).

Screen shot 500 shows a number of features of an embodiment after a user activates an expander. The top portion of screen shot 500 is the top portion of the media file that was being watched. In some embodiments, the media file can be automatically placed in a pause mode when the expander opens. In other embodiments, the media file can continue playing. In either embodiment, the video image can be compressed or reduced while the expander is open so that the entire video image can be seen on the screen, or the bottom part of the video image can be covered up by the expander.

Transport controls 515 serve a similar purpose as transport controls 415 in FIG. 4. Slider 520 serves a similar purpose as slide 420 of FIG. 4, and indicator 522 serves a similar purpose as indicator 422. Status display 580 can display information such as elapsed time, time remaining, and the like. In some embodiments, the media file can be paused, unpaused, or advanced even after the expander was activated.

Tab 525 is the expanded version of expander 425 of FIG. 4. Expander 525 might have a variety of different modes. At the top of expander 525 are the available modes. The user can switch between an information mode and a poster mode by selecting information mode button 533 or poster 537 mode button. In FIG. 5A, screen shot 500 features the information mode.

Information mode lists a variety of different information about the media file being played. This information can include title box 532, synopsis box 534, cast box 540, and detail box 544. Title box 532 shows the title of the media file being played. Synopsis box 534 can be configured to show a summary of the media file being played, such as a few sentences that briefly set forth the plot of a movie. Cast box 540 can be configured to information about who is featured in a particular media file, such as actors, actresses, and directors. Detail box 544 can contain a variety of different information, such as a Motion Picture Association of America (MPAA) rating (e.g., G, PG, PG-13, R, or NC-17), a genre (action, comedy, romance, etc.), the length of the media file, and the year of release. Additional information can also be present. There can also be a closing selector 548 which enables a user to close the information box to return the movie to full screen mode.

In addition, there can be an ordering button 550. In some embodiments, the media file being played could be a trailer or other type of preview for a full movie. In such a case, ordering button 550 can allow the user to order the movie if it is currently available, put the movie on a user's notification list (such that the user will be informed when the movie becomes available), or a user's wishlist (such that the movie will be stored in a list of movies that the user wishes to see in the future).

Figure 5B:
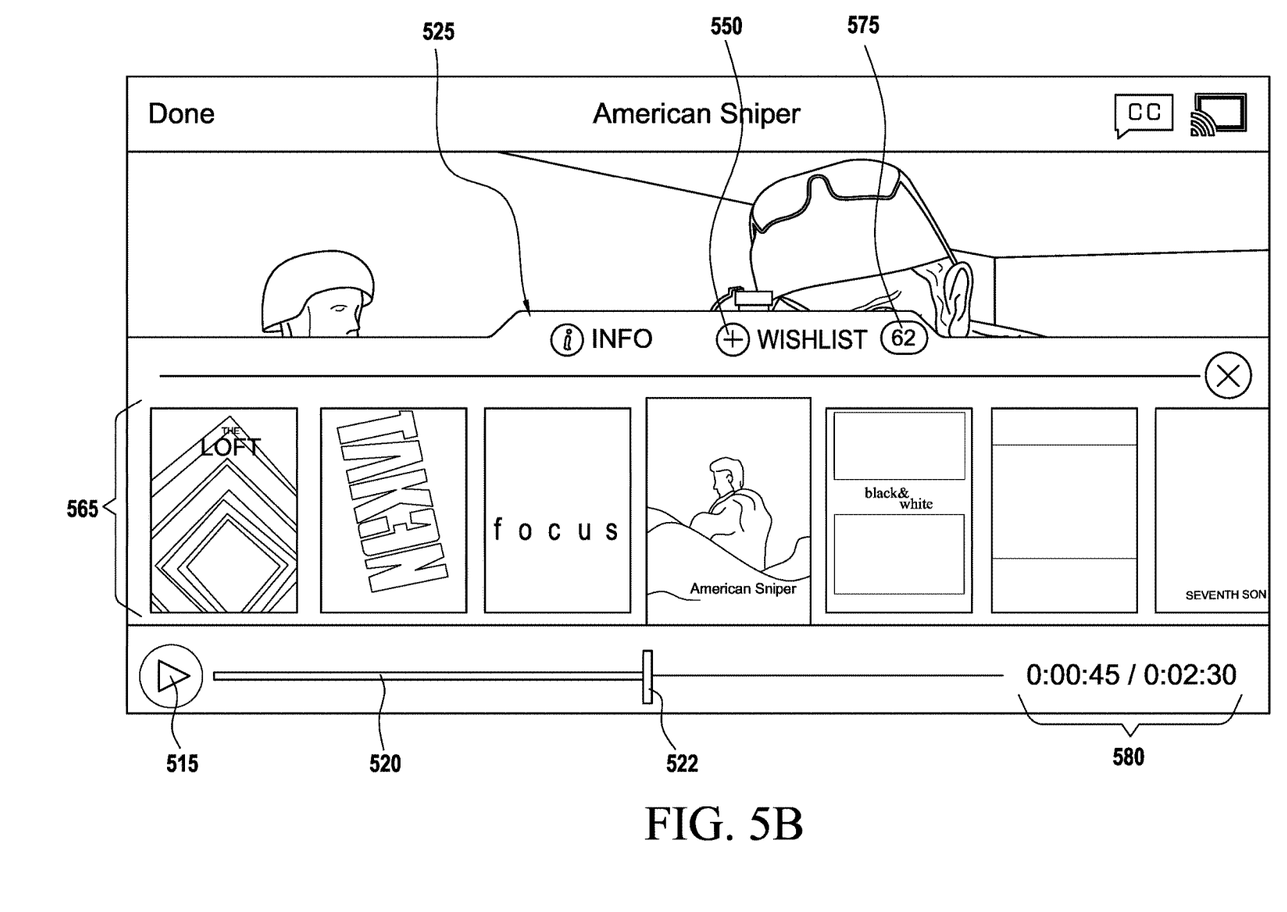

With reference to FIG. 5B, a screen shot 500 containing an illustration of an exemplary interface of after the expander screen is opened. As an example, screen shot 500 can be shown on a screen of monitor 106 (FIG. 1).

FIG. 5B is similar to FIG. 5A, except the user has chosen to view the poster mode through the use of expander 525. After the user selects the poster mode, a series of graphical images 565 are shown to the user. In some embodiments, graphical images 565 represent movies that the user has added to his wishlist. In an embodiment used with a touch-sensitive interface, if more movies are saved than can be shown on a single screen, the user can use various swiping commands (e.g., swiping to the left or to the right) to view the remainder of his list. In an embodiment using another type of interface, there can be a variety of different navigational devices, such as a cursor, a scroll bar, arrows, and the like. Ordering button 550 also can be present in the poster mode, allowing a user to add the currently playing media file to his wishlist. In some embodiments, the currently playing media file could be a trailer or other type of preview of a movie that the user might not own or otherwise have access to. Ordering button 550 can add the currently playing media file to a wishlist. In some embodiments, a wishlist is a list of movies or other media files that the user expressed interest in viewing at one time. There might also be an indicator 575 that is configured to show the user how many titles the user has in his wishlist.

In some embodiments, instead of ordering button 550 adding a movie to a wishlist, ordering button 550 can be used to purchase, rent, or otherwise give the user access to the media file.

Each of the graphical images 565 can show a variety of different information. In some embodiments, each of graphical images 565 is a representation of the movie poster actually used to advertise the movie. In some embodiments, each of graphical images 565 contains elements of a movie poster, possibly sharing characteristics with actual movie posters (such as similar typefaces and photos). In some embodiments, each of graphical images 565 can be the title of the movie, possibly with an image representative of the movie as a background. In some embodiments, there can be a setting that allows a user to switch between a textual representation of a media file and a graphical representation.

The movies being shown in FIG. 5B are not necessarily limited to a wishlist. In some embodiments, the graphical images 565 being shown to the user show available movies to watch from a variety of different sources. For example, the graphical images 565 can each represent movies or TV shows that the user has already purchased, rented, or otherwise has access to. In such a manner, the user can easily switch between movies that the user already has access to.

In some embodiments, the graphical images 565 can each represent trailers or previews of movies. Thus, the user can view a series of trailers. There might be an auto-play feature available which allows the user to cycle through multiple trailers. When the user comes upon a trailer that interests him, the user can add the title to his wishlist or can purchase access to the movie (either immediate access or access when the movie becomes available for purchase) in the manner described above. Or the user can use the information screen shown in FIG. 5A to obtain additional information.

Figure 6:
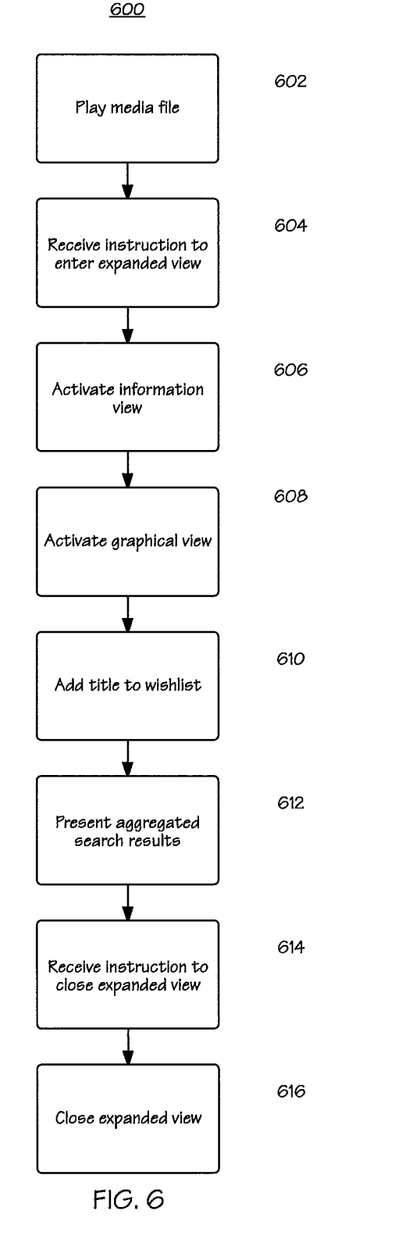
FIG. 6 is a flow chart illustrating the operation of an embodiment.

A flowchart illustrating the operation of a method 600 is presented in FIG. 6. Method 600 is merely exemplary and is not limited to the embodiments presented herein. Method 600 can be employed in many different embodiments or examples not specifically depicted or described herein. In some embodiments, the procedures, the processes and/or the activities of method 600 can be performed in the order presented. In other embodiments, the procedures, the processes, and/or the activities of method 600 can be performed in any other suitable order. In still other embodiments, one or more of the procedures, the processes, and/or the activities of method 600 can be combined or skipped. In some embodiments, portions of method 600 can be implemented by computer system 100 (FIG. 1).

A device is playing a media file (block 602). The device can be a mobile device, possibly utilizing a touch-sensitive interface. The device can be a web interface, possibly utilizing a keyboard/mouse interface. The device can be a set-top box connected to a television or a monitor, possibly utilizing a remote control interface. A combination of interfaces can be used—for example, one could use both a remote control interface and a keyboard/mouse interface with certain devices, or both a touch-sensitive and keyboard/mouse interface with devices such as a laptop with a touchscreen or touchpad.

The playback of the media file can be initiated in a variety of different manners. For example, there can be a list of available media files to play that is displayed to the user. A user selects a media file (often by tapping or clicking a thumbnail representative of a media file or a title of the media file), and the playback of the media file can begin using a variety of techniques known in the art. The media file might be an audio only file (such as an MPEG-2 Audio Layer 3 (MP3) file). The media file might be a visual-only file (such as a slideshow). The media file might include both audio and video, such as a movie, TV show, documentary, concert, and the like.

The device receives an instruction to enter into an expanded view mode (block 604). As described above, the expanded view mode can be entered into in a variety of different manners. In some embodiments, the expanded view mode can be initiated by a user tapping (for a touch-sensitive interface), swiping upward (for a touch-sensitive interface), or clicking (using a mouse or remote control interface) in a specific area of the screen. In some embodiments, the expanded view mode can be initiated by a user performing a swiping motion in a specific area of the screen.

When the device receives such an input, the expanded view mode is activated. The expanded view mode can be either the information mode or the poster mode, depending on a preference or selection of a user. In other words, there can be a "preferences" menu choice in which a user chooses whether the expanded view opens in an information view or in a poster view. There can be a default opening choice and in some embodiments, the default mode is information view.

When the information view is activated (block 606), a variety of information is displayed. As described above, the information can include a synopsis, cast information, a genre, an MPAA rating, a year of release, a length of the movie, and the like. The information view can result in an overlay of the information on top of the media file being played. In an embodiment such as that illustrated in FIGS. 5A and 5B, the overlay can be on top of the lower half of the screen that is showing the media file. The overlay can be configured such that text or images are visable when displayed on the overlay. In some embodiments, the overlay can be dark such that light text printed on the overlay is visible. In some embodiments, the overlay can be light such that dark text printed on the overlay is visible. In some embodiments, the overlay can be opaque such that an image being overlaid is not visible. In some embodiments, the overlay can be partially transparent, such that part of an image being overlaid is visible.

When the graphical view is activated (block 608), the user can be presented with a variety of graphical images, each of which is representative of a media file (such as a movie, documentary, episode of a TV show, music video, and the like). The graphical view can be activated in a variety of different manners. For example, there might be a button that allows a user to choose between the information view and the graphical view.

The user can also be presented with the option to add the media file to a wishlist. If the user chooses to add the media file to a wishlist (block 610), a list can be added to that contains a list of media files that the user is interested in. The option to add the media file to a wishlist can be present in either the poster mode, the information view, or both views. The list can later be accessed by the user when choosing a media file to view.

The user can also select one of the graphical images. Upon receiving such a selection (block 612), the playback of the media file represented by the graphical image can be started. Block 606 can occur before or after any of blocks 608, 610, 612, and 614.

When the user chooses to close the expanded view (block 614), the media file can resume a full screen mode by removing the closing the overlaying screen and playback can resume (block 616).

Figure 7:
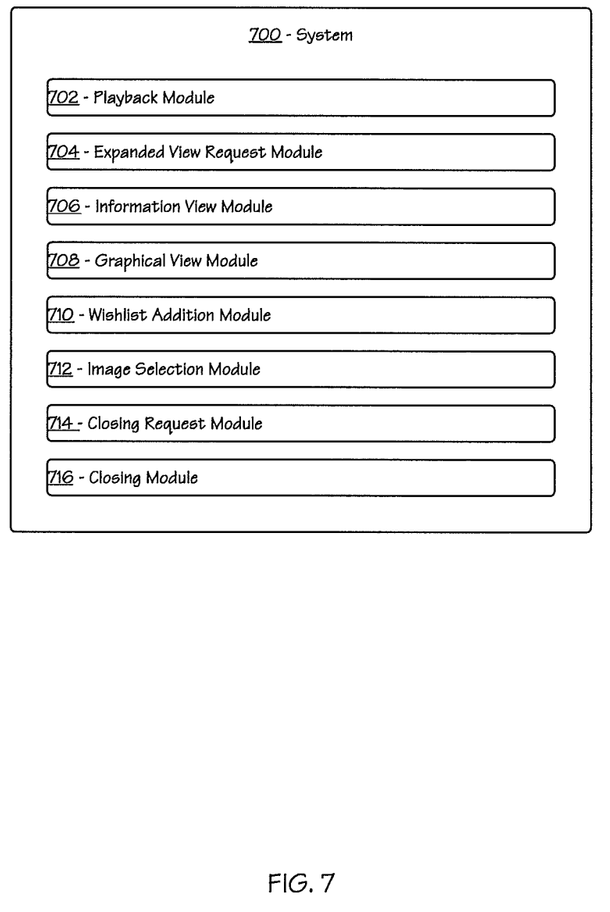
FIG. 7 is a block diagram illustrating a system capable of performing an embodiment.

Turning ahead in the figures, FIG. 7 illustrates a block diagram of a system 700 that is capable of performing disclosed embodiments. System 700 is merely exemplary and is not limited to the embodiments presented herein. System 700 can be employed in many different embodiments or examples not specifically depicted or described herein. In some embodiments, certain elements or modules of system 700 can perform various procedures, processes, and/or acts. In other embodiments, the procedures, processes, and/or acts can be performed by other suitable elements or modules.

In a number of embodiments, system 700 can include playback module 702. In certain embodiments, playback instruction receiving module 702 can perform block 602 (FIG. 6) of playing a media file.

In a number of embodiments, system 700 can include expanded view request module 704. In certain embodiments, expanded view request module 704 can perform block 604 (FIG. 6) of receiving a request to enter expanded view mode.

System 700 can include information view module 706. In certain embodiments, information view module 706 can perform block 606 (FIG. 6) of entering an information view mode.

System 700 can include poster mode module 708. In certain embodiments, poster mode module 708 can perform block 608 (FIG. 6) of displaying thumbnails on the mobile device.

System 700 can include wishlist addition module 710. In certain embodiments, wishlist addition module 710 can perform block 610 (FIG. 6) of adding a media file to a wishlist.

System 700 can include image selection module 712. In certain embodiments, image selection module 712 can perform block 612 (FIG. 6) of receiving an input indicating a desire to playback a selected media file.

System 700 can include closing request module 714. In certain embodiments, closing module 714 can perform block 614 (FIG. 6) of receiving a request to close an expanded view.

System 700 can include closing module 716. In certain embodiments, closing module 716 can perform block 616 (FIG. 6) of closing an expanded view.

The above embodiments have been described with reference to media file playback. It will be understood by those skilled in the art that various changes can be made without departing from the spirit or scope of the disclosure. For example, the media file can include audio only, video only, or a combination of audio and video.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 can be modified, and that the foregoing discussion of certain of these embodiments does not necessarily represent a complete description of all possible embodiments. For example, one or more of the procedures, processes, or activities of FIGS. 1-7 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer readable media storing computing instructions configured to run on the one or more processors and perform acts of:
initiating a playback of an active media file on a screen of an electronic device;
during the playback of the active media file on the screen of the electronic device, receiving an instruction to enter an expanded view mode comprising an upward swiping motion on an expander displayed on a touch-sensitive display when the expander is closed;
responsive to receiving the instruction to enter the expanded view mode, and during the playback of the active media file on the screen of the electronic device, opening the expander displayed on the screen during the playback of the active media file, wherein:
the expander is configured, when open, to display an information mode and a poster mode on the screen at different times during the playback of the active media file;
the information mode is displayed, in response to the expander being open, as a default mode; and
the poster mode is displayed, in response to the expander being open, when a user selects an option in a preferences menu to set the poster mode as the default mode;
displaying the information mode on the screen at the expander during the playback of the active media file;
displaying the poster mode on the screen at the expander during the playback of the active media file;
receiving an instruction to end the expanded view mode; and
responsive to receiving the instruction to end the expanded view mode, and during the playback of the active media file on the screen of the electronic device, closing the expander on the screen, wherein:
the poster mode comprises a display of one or more graphical images representing one or more media files; and
displaying the information mode on the screen during the playback of the active media file comprises displaying at least one of synopsis information of the active media file, cast information of the active media file, rating information of the active media file, genre information of the active media file, length information of the active media file, or a year of release of the active media file.

2. The system of claim 1, wherein the computing instructions are further configured to run on the one or more processors and perform acts of:
receiving a request to view a media file of the one or more media files; and
responsive to receiving the request to view the media file of the one or more media files:
commencing a playback of the media file of the one or more media files.

3. The system of claim 2, wherein commencing the playback of the media file of the one or more media files comprises:
responsive to the playback of the active media file being completed, commencing the playback of the media file of the one or more media files.

4. The system of claim 1, wherein:
the one or more media files comprise one or more preview media files.

5. The system of claim 1, wherein the computing instructions are further configured to run on the one or more processors and perform acts of:
receiving a request to add a media file of the one or more media files to a wishlist; and responsive to receiving the request to add the media file of the one or more media files to the wishlist:
adding the media file of the one or more media files to the wishlist, wherein the wishlist comprises a list of media files to be viewed on the screen of the electronic device.

6. The system of claim 1, wherein the computing instructions are further configured to run on the one or more processors and perform acts of:
receiving a request to initiate a purchase transaction of a media file of the one or more media files; and
initiating the purchase transaction of the media file of the one or more media files.

7. The system of claim 1, wherein:
the screen of the electronic device comprises the touch-sensitive display; and
receiving the instruction to end the expanded view mode comprises receiving a downward swiping motion on the expander displayed on the touch-sensitive display when the expander is open.

8. The system of claim 1, wherein:
opening the expander displayed on the screen during the playback of the active media file comprises overlaying the expander over the active media file during the playback of the active media file.

9. The system of claim 1, wherein:
opening the expander displayed on the screen during the playback of the active media file comprises overlaying the expander over at least half of the active media file during the playback of the active media file.

10. The system of claim 1, wherein:
opening the expander displayed on the screen during the playback of the active media file comprises reducing a size of the active media file during the playback of the active media file.

11. The system of claim 1, wherein:
the one or more graphical images comprise a series of graphical images;
the one or more media files comprise:
a media file purchased by the user;
a media file pre-purchased by the user before a release date;
a media file rented by the user; and
a media file available for rent by the user; and
the computing instructions are further configured to run on the one or more processors and perform an act of:
notifying the user, on the release date, that the media file pre-purchased by the user is available.

12. The system of claim 11, wherein the computing instructions are further configured to run on the one or more processors and perform an act of:
receiving an instruction to scroll the series of graphical images comprising a swiping motion substantially perpendicular to the upward swiping motion.

13. A method comprising:
initiating a playback of an active media file on a screen of an electronic device;
during the playback of the active media file on the screen of the electronic device, receiving an instruction to enter an expanded view mode comprising an upward swiping motion on an expander displayed on a touch-sensitive display when the expander is closed;
responsive to receiving the instruction to enter the expanded view mode, and during the playback of the active media file on the screen of the electronic device, opening the expander displayed on the screen during the playback of the active media file, wherein:
the expander is configured, when open, to display an information mode and a poster mode on the screen at different times during the playback of the active media file;
the information mode is displayed, in response to the expander being open, as a default mode; and
the poster mode is displayed, in response to the expander being open, when a user selects an option in a preferences menu to set the poster mode to be as the default mode;
displaying the information mode on the screen at the expander during the playback of the active media file;
displaying the poster mode on the screen at the expander during-the playback of the active media file;
receiving an instruction to end the expanded view mode; and
responsive to receiving the instruction to end the expanded view mode, and during the playback of the active media file on the screen of the electronic device, closing the expander on the screen, wherein:
the poster mode comprises a display of one or more graphical images representing one or more media files; and
displaying the information mode on the screen during the playback of the active media file comprises displaying at least one of synopsis information of the active media file, cast information of the active media file, rating information of the active media file, genre information of the active media file, length information of the active media file, or a year of release of the active media file.

14. The method of claim 13 further comprising:
receiving a request to view a media file of the one or more media files; and
responsive to receiving the request to view the media file of the one or more media files, commencing a playback of the media file of the one or more media files.

15. The method of claim 14, wherein commencing the playback of the media file of the one or more media files comprises:
responsive to the playback of the active media file being completed, commencing the playback of the media file of the one or more media files.

16. The method of claim 13 further comprising:
receiving a request to add a media file of the one or more media files to a wishlist; and
responsive to receiving the request to add the media file of the one or more media files to the wishlist:
adding the media file of the one or more media files to the wishlist, wherein the wishlist comprises a list of media files to be viewed on the screen of the electronic device.

17. The method of claim 13, wherein:
the one or more media files comprise one or more preview media files.

18. The method of claim 13 further comprising:
receiving a request to initiate a purchase transaction of a media file of the one or more media files; and
initiating the purchase transaction-of the media file of the one or more media files.

19. The method of claim 13, wherein:
the screen of the electronic device comprises the touch-sensitive display; and
receiving the instruction to end the expanded view mode comprises receiving a downward swiping motion on the touch-sensitive display when the expander is open.

20. The method of claim 13, wherein:
opening the expander displayed on the screen during the playback of the active media file comprises overlaying the expander over the active media file during the playback of the active media file.

21. The method of claim 13, wherein:
opening the expander displayed on the screen during the playback of the active media file comprises overlaying the expander over at least half of the active media file during the playback of the active media file.

22. The method of claim 13, wherein:
opening the expander displayed on the screen during the playback of the active media file comprises reducing a size of the active media file during the playback of the active media file.

23. The method of claim 13, wherein:
the one or more graphical images comprise a series of graphical images;
the one or more media files comprising:
 a media file purchased by the user;
 a media file pre-purchased by the user before a release date;
 a media file rented by the user; and
 a media file available for rent by the user; and
the method further comprises:
 notifying the user, on the release date, that the media file pre-purchased by the user is available.

24. The method of claim 23, further comprising:
receiving an instruction to scroll the series of graphical images comprising a swiping motion substantially perpendicular to the upward swiping motion.

\* \* \* \* \*